(12) United States Patent
Da Col

(10) Patent No.: US 9,904,073 B2
(45) Date of Patent: Feb. 27, 2018

(54) HINGE DEVICE FOR SPECTACLE FRAMES

(71) Applicant: SAFILO SOCIETÀ AZIONARIA FABBRICA ITALIANA LAVORAZIONE OCCHIALI S.P.A., Padua (IT)

(72) Inventor: Angelo Da Col, Pieve di Cadore (IT)

(73) Assignee: SAFILO SOCIETÀ AZIONARIA FABBRICA ITALIANA LAVORAZIONE OCCHIALI S.P.A., Padua (IT)

( * ) Notice: Subject to any disclaimer, the term of this patent is extended or adjusted under 35 U.S.C. 154(b) by 0 days.

(21) Appl. No.: 15/522,511

(22) PCT Filed: Oct. 26, 2015

(86) PCT No.: PCT/EP2015/074742
§ 371 (c)(1),
(2) Date: Apr. 27, 2017

(87) PCT Pub. No.: WO2016/066583
PCT Pub. Date: May 6, 2016

(65) Prior Publication Data
US 2017/0322428 A1    Nov. 9, 2017

(30) Foreign Application Priority Data
Oct. 30, 2014 (IT) .............................. PD2014A0286

(51) Int. Cl.
*G02C 5/22* (2006.01)
(52) U.S. Cl.
CPC ......... *G02C 5/2281* (2013.01); *G02C 5/2218* (2013.01); *G02C 2200/20* (2013.01)
(58) Field of Classification Search
CPC ....... E05D 7/10; Y10T 16/526; Y10T 16/537; G02C 5/2236; G02C 5/22; G02C 5/2227;
(Continued)

(56) References Cited

U.S. PATENT DOCUMENTS 2,828,668 A  *  4/1958  De Angelis .......... G02C 5/2209
16/228
3,396,425 A  *  8/1968  Metcalfe .............. G02C 5/2281
16/228

(Continued)

FOREIGN PATENT DOCUMENTS

DE            2356818 A1      5/1975
DE         19630445 A1 *      2/1998   ........... G02C 5/2281
(Continued)

*Primary Examiner* — Chuck Mah
(74) *Attorney, Agent, or Firm* — Volpe and Koenig, P.C.

(57) ABSTRACT

What is described is a hinge device for connecting the sides (2) to the fronts of spectacle frames (4), comprising a first and a second hinge element (6, 7) pivoting about a hinge axis (X), the first element (6) comprising a substantially fork-shaped body (8) with a first and a second arm (9, 10) opposed to one another, between which the second hinge element (7) is interposed, and a screw means (16) forming a hinge pin, passing through respective holes formed coaxially in the first and the second hinge element (6, 7), so as to be, respectively, locked by a screw engagement in the first hinge element (6) and housed rotatably in the second hinge element (7). The device further comprises at least a first anti-seizing sleeve (18) provided in the hole (13) of the second hinge element (7) and capable of being engaged by the hinge screw (16) in a rotatable coupling, the sleeve (18) comprising at least a first surface (20) extending in a contact area and capable of relative sliding between the hinge elements (6, 7), at least one ring (22) of elastically flexible material, fitted on the hinge screw (16) and capable of being deformed elastically as a result of the tightening of the screw so as to exert a relative pressure between the first and the second hinge element (6, 7), thereby increasing the friction provided between the hinge elements, and at least one bush (23) mounted in a seat of the first hinge element (6), coaxially with the hinge screw (16), and capable of accom- (Continued)

modating the ring (22), the bush (23) including at one of its axial ends a bearing shoulder (24) for the ring (22), and being capable of making contact with the first surface of the anti-seizing sleeve (18), so that the bush (23) is biased axially against the sleeve (18) by the elastic action generated by the friction ring (22) as a result of the tightening of the hinge screw (16).

10 Claims, 4 Drawing Sheets

(58) Field of Classification Search
CPC .......... G02C 5/14; G02C 5/16; G02C 5/2209; G02C 5/2218; G02C 5/2254; G02C 5/2263; G02C 5/2272; G02C 5/2281; G02C 5/229; G02C 2200/06; G02C 2200/20
See application file for complete search history.

(56) References Cited

U.S. PATENT DOCUMENTS

| | | | | |
|---|---|---|---|---|
| 4,428,094 A | * | 1/1984 | Emain | E05D 11/082 16/228 |
| 4,675,940 A | * | 6/1987 | Brockhaus | E05D 5/127 16/254 |
| 4,951,349 A | * | 8/1990 | Dietrich | E05D 11/087 16/228 |
| 5,599,056 A | * | 2/1997 | Schmitt | B60J 7/1234 16/259 |
| 5,867,870 A | * | 2/1999 | Kluting | E05D 5/128 16/254 |
| 7,010,831 B1 | | 3/2006 | Beck et al. | |
| 2010/0299872 A1 | * | 12/2010 | Wannenmacher | G02C 5/2281 16/228 |

FOREIGN PATENT DOCUMENTS

| | | | | |
|---|---|---|---|---|
| DE | 19931837 A1 | | 2/2001 | |
| EP | 0384289 A2 | * | 8/1990 | ............ F16C 11/02 |
| FR | 1503973 A | | 12/1967 | |
| FR | 2251022 A1 | * | 6/1975 | ........... G02C 5/2281 |
| FR | 2607270 A1 | * | 5/1988 | ........... G02C 5/2281 |
| JP | 2003302607 A | * | 10/2003 | |
| WO | 03034128 A1 | | 4/2003 | |

* cited by examiner

HINGE DEVICE FOR SPECTACLE FRAMES

TECHNICAL FIELD

The present invention relates to a hinge device for connecting the sides to the fronts of spectacle frames according to the preamble of Claim 1. The invention further comprises spectacles provided with the aforesaid device.

TECHNOLOGICAL BACKGROUND

In the specific technical field, there is a known way of providing pivotable spectacle sides by means of respective eyelet-shaped formations, fixed to the sides and to the lugs of the frames, in which are engaged screws or threaded pins forming hinge pins for the pivotable connection of the sides.

In these solutions, a first problem is posed by the undesired slackening of the screw or threaded pin, making it necessary to carry out periodic tightening, thus creating difficulties for the user who is generally not equipped with suitable tools, especially in the case of hinge devices whose sizes and overall dimensions are extremely small. The spontaneous unscrewing of the hinge screw is typically caused by the cyclic rotation, with mutual contact, of the hinge elements (the male and female parts) pivoting around the screw or hinge pin.

Another limitation that may be encountered in known solutions is that created by the phenomenon of "seizing" which occurs between the male and female parts of the hinge. In fact, the continual sliding between the surfaces of these parts facing one another and in mutual contact, the parts being typically made of the same material, may cause the hinge to jam after a certain number of rotation cycles.

Yet another limitation is that which relates to the loss over time of the frictional effect initially introduced between the hinge elements. In fact, with use, the mutual sliding contact of the hinge elements progressively increases the play in the coupling, which tends to limit the frictional effect, that is to say the resistance to rotation between the male and female parts of the hinge, resulting in the loss of this characteristic.

DESCRIPTION OF THE INVENTION

A principal object of the invention is to provide a hinge device for the pivotable connection of the sides to the fronts of spectacle frames, structurally and functionally designed to overcome the limitations that can be seen in the known solutions.

This object, and others which will become more fully evident below, are achieved by a hinge device, for the pivotable connection of sides to the fronts of spectacle frames, made in accordance with the appended claims.

BRIEF DESCRIPTION OF THE DRAWINGS

Other features and advantages of the invention will become more fully evident from the following detailed description of a preferred example of embodiment thereof, illustrated, for the purpose of guidance and in a non-limiting way, with reference to the appended drawings, in which.

PREFERRED EXAMPLE OF THE INVENTION

Figure 2:
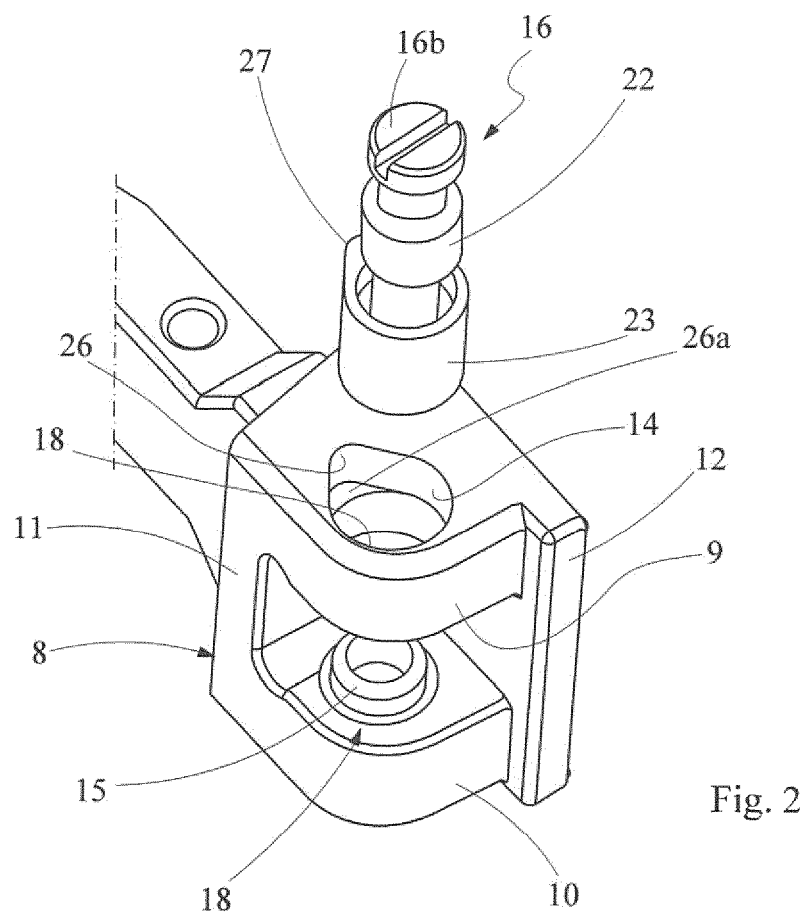
FIGS. 1 and 2 are partial perspective views of a hinge device made according to the present invention, shown, respectively, in an assembled condition and with parts detached.
Figure 1:
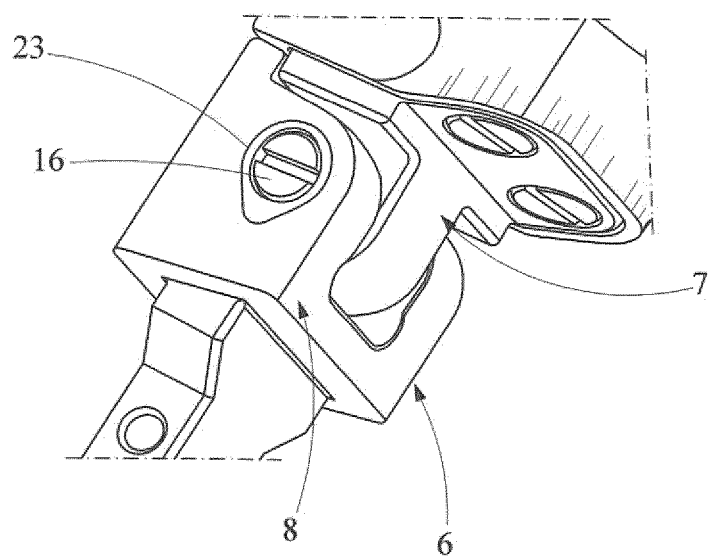
Figure 3:
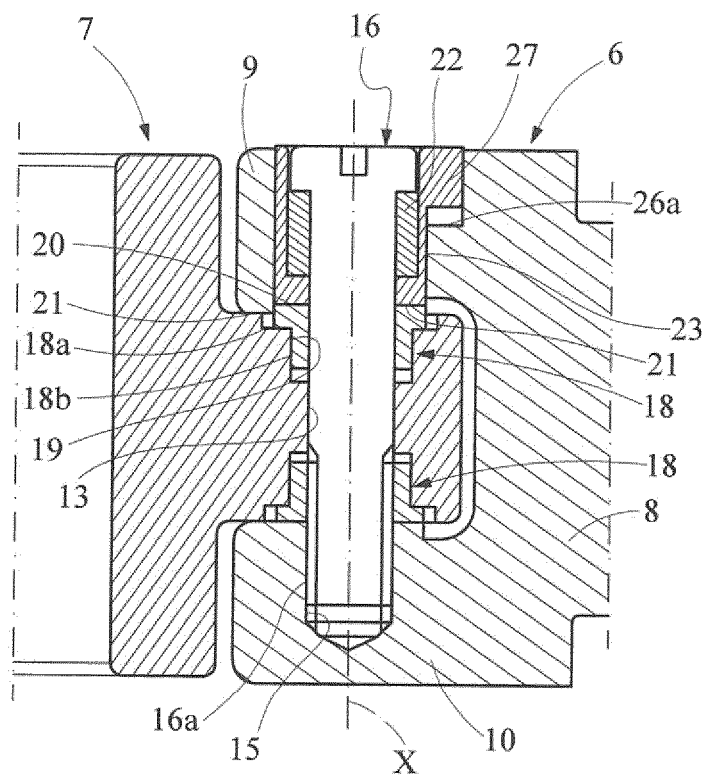
FIG. 3 is a view in axial section of the hinge elements of the device of the preceding figures.
Figure 4:
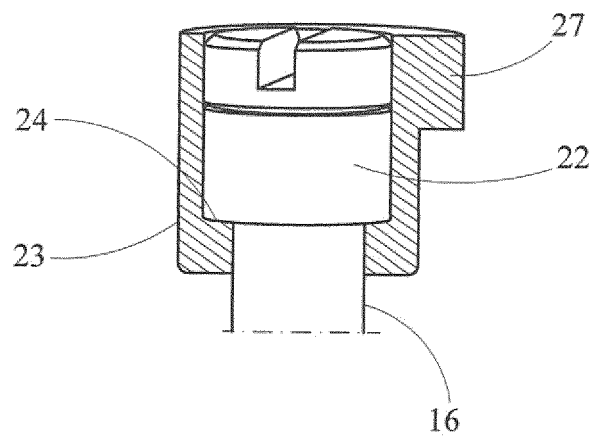
FIG. 4 is a perspective view, in partial section, of a detail of the device of the preceding figures.
Figure 5:
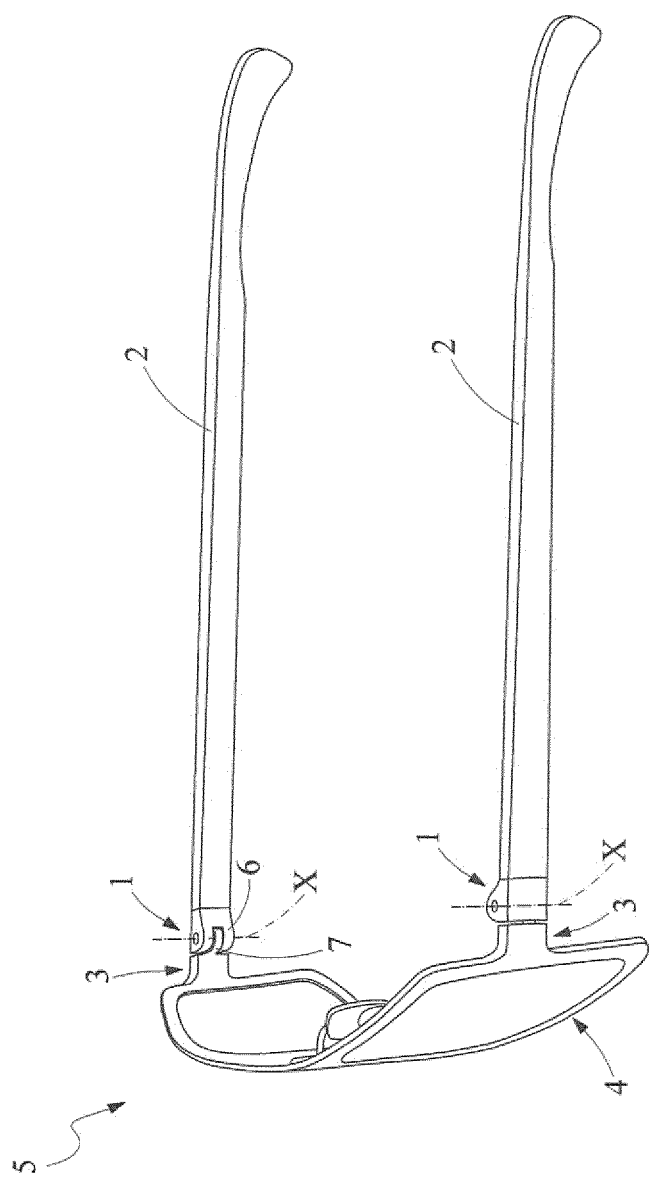
FIG. 5 is a view of a pair of spectacles including a hinge device according to the preceding figures, for the pivoting of each side on the frame.
Figure 6:
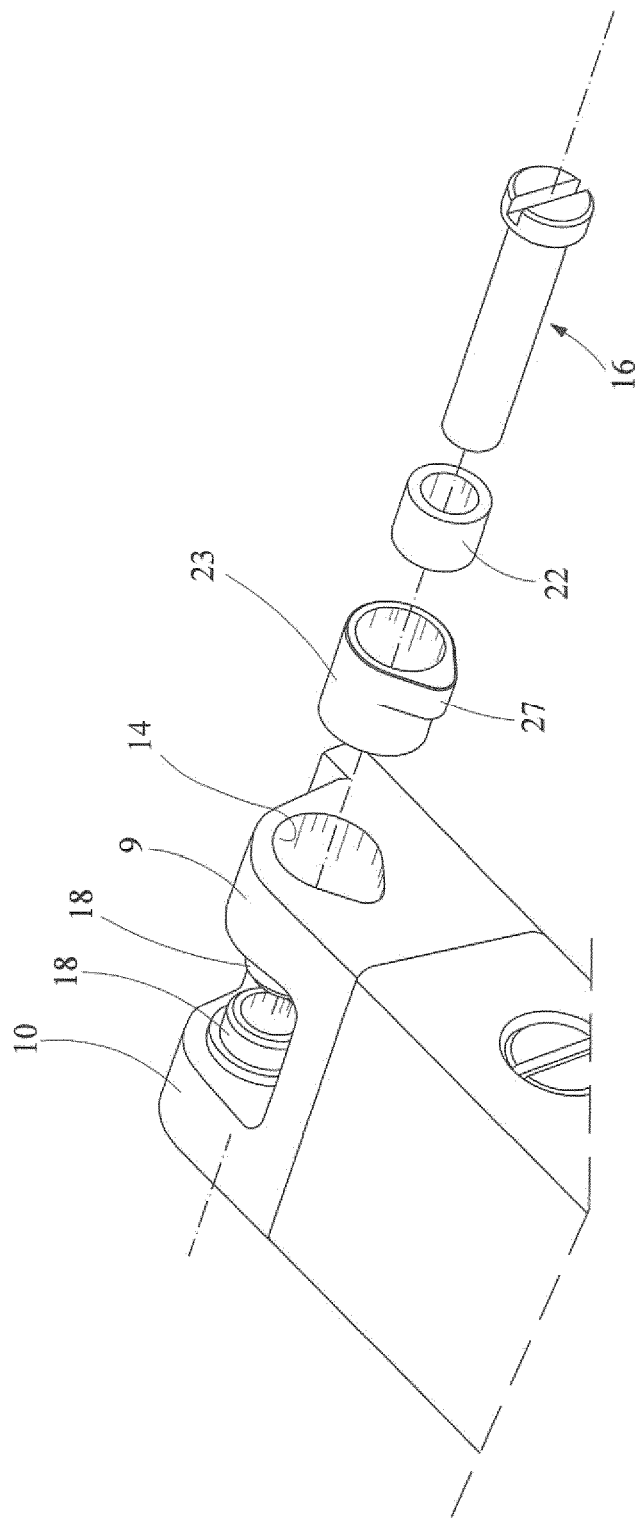
FIG. 6 is a further exploded perspective view of the device of the preceding figures.

With reference to the aforesaid drawings, the number 1 indicates the whole of a hinge device for the pivoting of a side 2 on a lug 3 of a frame 4 for spectacles 5 which are only partially illustrated, made according to the present invention. The hinge device 1 comprises a first and a second hinge element 6, 7, which are, respectively, connected to or incorporated in the side 2 and in the lug 3 of the front frame 4. The hinge elements 6, 7 can be fixed to, or made in one piece with, the respective ends of the side and the lug.

The hinge elements 6, 7 can swing relative to one another about a hinge axis X which is substantially perpendicular to the longitudinal direction of extension of the side.

The first hinge element 6 comprises a substantially fork-shaped body 8 with a pair of opposed arms 9, 10 extending from a common portion 11 and lateral connected by a plate-like part 12 which can remain visible when the spectacles are worn, thus concealing the hinge coupling from view. Additionally, the plate-like part 12 acts as a stop element between the side and the front frame, forming the limiting means ("end of travel") for the rotation of the side in the movement from the position with the sides closed to the position with the sides open.

The second hinge element 7, in which a through hole 13 is provided, can be interposed between the arms 9, 10. The numbers 14 and 15 indicate holes formed, respectively, in the arms 9 and 10 of the body 8, in a position corresponding to and coaxial with the hole 7, and a screw 16, forming a hinge pin, is provided so as to be housed rotatably in the holes of the hinge elements, thus forming the pivotable coupling of these elements about the axis X. Conveniently, the screw 16 is threaded along a terminal portion 16a of the screw, axially opposed to the head 16b of the screw, which can engage by screwing in the hole 15, suitably formed as a threaded blind hole.

The device also comprises a pair of sleeves 18 with an anti-seizing function, provided in the hole 13 of the second hinge element 7, and mounted in positions which are mirror symmetrical about a median plane of symmetry of the hinge element 7, transverse to the hinge axis X. Since they are structurally identical, only one of the sleeves 18 is described in detail below.

Each sleeve 18 comprises a first hollow cylindrical section 18a which is extended into a second hollow cylindrical section 18b having a smaller outside diameter, and is housed in a corresponding seat 19 formed in the second hinge element, the seat being defined by recesses having shapes and dimensions such that a positive coupling to the corresponding sections 18a, 18b is provided. The number 20 indicates a surface of the sleeve, defined at the free end of the section 18a of greater diameter, which extends, when the sleeve is engaged in the seat 19, in an area of sliding contact with a respective surface 21 of the corresponding fork arm 9, 10 facing it.

The sleeves 18 are conveniently made of a material having a lower surface hardness than that of the material of which the hinge elements ("female" part 6 and "male" part 7) are made, these elements being subjected to relative sliding in the rotation about the hinge axis.

Because of the provision of the sleeves 18, made of a material which is subject to wear with use, but does not erode the surfaces of the "male" and "female" parts of the hinge (made of harder and stronger material), the problem of possible seizing is therefore avoided. For example, the sleeves 18 can be made of a copper-zinc-nickel alloy, known as "Alpacca", or of a high-strength rigid plastic material such as the polymer polyoxymethylene, also known as acetal resin, while the female and male parts of the hinge can be made of steel, particularly stainless steel, that is to say materials which are much harder than the sleeve.

When the sleeve 18 is provided, the continuous sliding contact therefore occurs between each sleeve (surface 21) and the corresponding surface 20 of the hinge elements 6, 7 facing it, thus avoiding the risk of seizing of the hinge, since, in the relative sliding contact, it is the sleeve that is eventually consumed.

The hinge device is also provided with a ring 22 of elastically flexible material, which is fitted on the shank of the screw 16, under the head 16b, and can be deformed elastically as a result of the tightening of the screw, so as to exert a relative pressure between the first and the second hinge element 6, 7. The ring is therefore designed to form a system for providing a frictional effect in the hinge, that is to say a system for increasing the internal friction between the surfaces, as a result of the tightening pressure generated by its elastic deformation, thereby increase the resistance to relative rotation between the hinge elements. The extent of the deformation of the ring is also correlated proportionally with the force with which the screw is tightened, thus allowing the regulation of the amount of frictional effect.

Purely by way of example, materials that can be used for making the ring 22 may include polyurethane and polyamide.

The ring 22 is housed in a bush, indicated as a whole by 23, which is mounted in a seat defined by the through hole 14 (provided in the arm 9 of the fork-shaped body) of the first hinge element 6. The bush 23, also preferably made of steel, has a hollow cylindrical shape, having a shoulder 24 at one of its axial ends, delimiting the central hole for the passage of the hinge screw, the ring 22 bearing against this shoulder. Externally, the end of the bush 23 near the shoulder 24 is in contact with the surface 20 of the corresponding sleeve 18 facing it. In this configuration, the bush 23 is therefore axially biased against the sleeve 18 in mutual contact by the elastic action generated by the friction ring 22, as a result of the tightening of the hinge screw, thereby recovering the degree of frictional effect in spite of the dimensional reduction of the sleeves 18 due to their use. In fact, assuming a certain progressive dimensional reduction of the sleeves during use, tending to decrease the frictional effect, the ring, by biasing the bush against the corresponding sleeve, is able to provide a compensatory action, correlated with its elastic dimensional recovery, thereby re-balancing the initial friction.

The hinge device is provided with means for preventing the rotation of the bush 23 relative to the hinge axis, these means comprising a positive coupling between a recess 26 provided in the first hinge element, adjacent to the hole 14, and an appendage 27 projecting from the bush 23, this positive coupling preventing relative rotation about the hinge axis. The friction between the surfaces of the bush 23, the ring 22 and the hinge screw 16 in mutual contact (generated by the pressure caused by the deformation of the ring as a result of the tightening of the screw) opposes the rotation of the screw, thereby counteracting the phenomenon of spontaneous unscrewing of the screw, that is to say the slackening of the screw during use.

Additionally, the bush 23 is engaged in the hole 14 with the possibility of limited axial sliding, as a result of which the dimensional reduction of the sleeves due to wear can be compensated, as described above.

Provision is also made to form the recess 26 with an axial depth such that the appendage 27, even after the progressive dimensional recovery of the elastic ring with its compensatory effect, never comes into contact with a bottom surface 26a of the recess 26, since if any contact occurs, with the bush 23 being stopped by bearing on this surface, the ring will provide no further compensatory effect.

Thus the invention achieves the proposed objects, while yielding numerous advantages by comparison with the known solutions.

A principal advantage lies in the fact that, using the hinge device of the invention, dimensional compensation is provided for the recovery of the reduction of the anti-seizing sleeves due to wear, in such a way that the degree of frictional effect initially introduced into the hinge, and provided by the elastic ring suitably deformed by the tightening of the screw, is maintained over time.

Another advantage is that the hinge device of the invention can be used to counteract the phenomenon of spontaneous unscrewing, that is to say the slackening of the hinge screw, caused by the cyclic rotation of the male part of the hinge about the female part relative to the hinge axis.

The invention claimed is:

1. A hinge device for connecting sides (2) to fronts of spectacle frames (4), comprising a first and a second hinge element (6, 7) pivoting about a hinge axis (X), the first hinge element (6) comprising a substantially fork-shaped body (8) with a first and a second arm (9, 10) opposed to one another, between which the second hinge element (7) is interposed, and a hinge screw (16) forming a hinge pin, passing through respective holes formed coaxially in the first and the second hinge element (6, 7), so as to be, respectively, locked by a screw engagement in the first hinge element (6) and housed rotatably in the second hinge element (7), the hinge device further comprising:

at least a first anti-seizing sleeve (18) provided in hole (13) of the second hinge element (7) and capable of being engaged by the hinge screw (16) in a rotatable coupling, the sleeve (18) comprising at least a first surface (20) extending in a contact area and capable of relative sliding between the hinge elements (6, 7), at least one ring (22) of elastically flexible material, fitted on the hinge screw (16) and capable of being deformed elastically as a result of the tightening of the screw so as to exert a relative pressure between the first and the second hinge element (6, 7), thereby increasing the friction provided between the hinge elements, and at least one bush (23) mounted in a seat of the first hinge element (6), coaxially with the hinge screw (16), and capable of accommodating the at least one ring (22), the bush (23) including at one of its axial ends a bearing shoulder (24) for the at least one ring (22), and being capable of making contact with the first surface (20) of the anti-seizing sleeve (18), so that the at least one bush (23) is biased axially against the sleeve (18) by the elastic action generated by the at least one ring (22) as a result of the tightening of the hinge screw (16).

2. The device according to claim 1, wherein the at least one bush (23) is engaged in the seat so as to be axially slidable to a limited extent.

3. The device according to claim 1, comprising means to prevent the rotation of the at least one bush (23) relative to the hinge axis (X).

4. The device according to claim 3, wherein the rotation prevention means comprise a positive coupling between a recess (26) provided on one of the first hinge element (6) and the at least one bush (23), and a respective appendage (27) formed on the other of the first hinge element (6) and the at least one bush (23), this positive coupling preventing relative rotation about the hinge axis (X), with freedom for relative sliding in the direction of this axis.

5. The device according to claim 1, wherein the at least one bush (23) is mounted in a first through hole (14) in the first arm (9) of the first hinge element (6), through which the hinge screw (16) is inserted so as to be locked by screw engagement in a corresponding second threaded hole (15) provided in the opposed second arm (10) of the first hinge element (6).

6. The device according to claim 1, wherein a pair of anti-seizing sleeves (18) are provided and are axially opposed in the through hole (13) provided in the second hinge element (7) for the rotatable engagement of the hinge screw (16), and wherein each of the sleeves (18) has a respective surface (20) extending in a corresponding contact area and capable of relative sliding between the first and the second hinge element (6, 7).

7. The device according to claim 1, wherein the anti-seizing sleeve (18) is made of a material having a lower hardness than the material of which the hinge elements are made (6, 7).

8. The device according to claim 7, wherein the sleeve (18) is made of a copper-zinc-nickel alloy material, or of a plastic material, and the hinge elements (6, 7) are made of steel.

9. The device according to claim 1, wherein the at least one bush (23) is made of steel.

10. Spectacles comprising a hinge device for articulated connection of the sides (2) to a front frame (4) of the spectacles, made according to claim 1.

* * * * *